United States Patent

Borden

[15] 3,642,135
[45] Feb. 15, 1972

[54] WASTE DISPOSAL ASSEMBLY

[72] Inventor: Abraham Gale Borden, 5 Central Drive, Port Washington, N.Y. 11050

[22] Filed: Aug. 25, 1969

[21] Appl. No.: 852,859

Related U.S. Application Data

[63] Continuation-in-part of Ser. No. 724,988, Apr. 29, 1968, abandoned.

[52] U.S. Cl............................210/97, 4/10, 210/64, 210/152, 210/257
[51] Int. Cl. .........................................C02b 3/04
[58] Field of Search..............210/152, 12, 97, 64, 252, 257; 4/8, 10, 115

[56] References Cited

UNITED STATES PATENTS

| | | | |
|---|---|---|---|
| 3,342,337 | 9/1967 | Reid | 210/152 |
| 3,504,797 | 4/1970 | Reid | 210/152 |
| 3,509,999 | 5/1970 | Reid et al. | 210/152 X |
| 1,633,080 | 6/1927 | Engle | 210/532 S |
| 2,658,202 | 11/1953 | Wolman et al. | 4/8 |
| 3,395,799 | 8/1968 | Kurtz | 210/12 X |
| 3,396,410 | 8/1968 | Gray | 4/10 |
| 3,535,712 | 10/1970 | Zeff et al. | 4/10 |

FOREIGN PATENTS OR APPLICATIONS

| | | | |
|---|---|---|---|
| 952,026 | 11/1956 | Germany | 210/97 |

Primary Examiner—Michael Rogers
Attorney—James J. Salerno, Jr.

[57] ABSTRACT

Process for the substantial reduction of bacterial count in sewage waste and assembly for treating same. The assembly comprises means for conveying sewage waste material to a treatment zone, means for retaining the waste material therein, temperature control means to insure that the contents retained in the treatment zone attain a temperature at least that of boiling water and means for passing the treated sewage waste from the treatment zone so that upon discharge of the treated waste material, substantially all of the bacteria have been destroyed.

10 Claims, 4 Drawing Figures

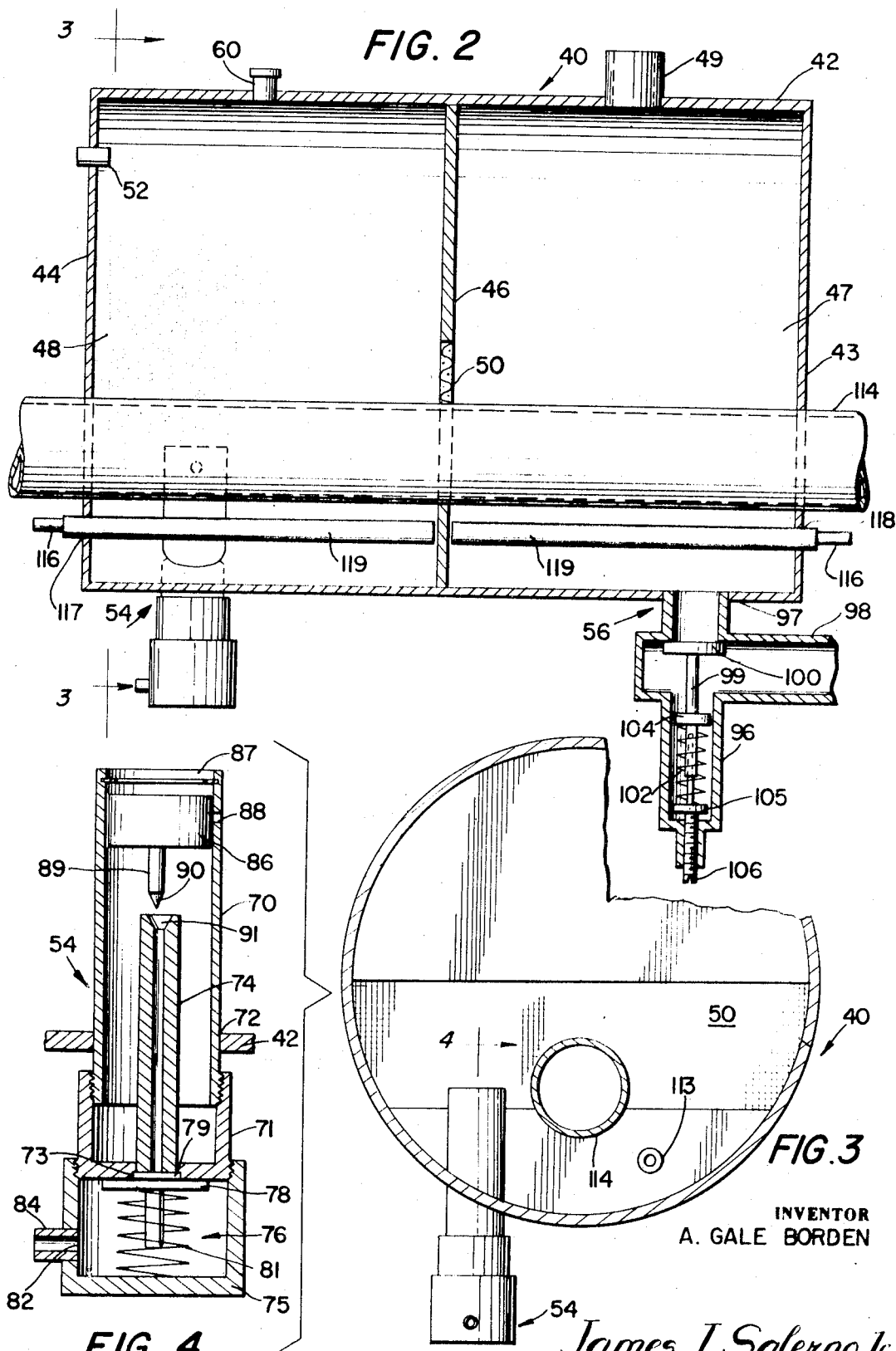

WASTE DISPOSAL ASSEMBLY

This application is a continuation-in-part of my patent application Ser. No. 724,988, filed Apr. 29, 1968, and now abandoned.

BACKGROUND OF THE INVENTION

During the past several years both the Federal and state governments have undertaken to decrease and limit the extent of pollution of our natural waterways, harbors or lakes by the enactment of laws to prevent the indiscriminate dumping of wastes. The mounting number of pleasure water craft having toilet facilities which empty their contents into the surrounding waters has added to the pollution problem in harbors, lakes and waterways. Also, dwellings, such as cabins, trailers or the like, having toilet facilities often cause sewage waste to be dumped into surrounding waters, i.e., lakes or rivers. These toilet facilities may employ chemical additives to control odor and to decrease the bacterial count. Another type of toilet facility employs incineration as a means for disposal of waste.

The former method has not proven satisfactory because the final bacterial count cannot be controlled with sufficient reliability. Also, where chemicals are employed they constitute an additional pollutant and add to the biological hazards. The latter method, although effective, increases the fire hazard aboard marine craft, trailers, cabins or the like, to an extent that it is not practical. Also, the latter method is quite odoriferous due to the noxious fumes discharged by incineration. Where neither incineration nor chemical means for treating sewage waste is employed no attempt is made to destroy or control the bacterial count in the discharged sewage waste.

SUMMARY OF THE INVENTION

The present invention generally contemplates an improved waste disposal assembly for processing the sewage waste. The assembly comprises a waste treatment means connected to standard toilet facilities. The waste treatment means is connected to a heat transfer unit so that the sewage waste when passing through the treatment means is subjected to heat whereby the waste is elevated to a temperature of at least the boiling point of water. Control means is provided for retaining the sewage waste in the treatment means for a sufficient period of time at the elevated temperature whereby the bacterial count of the waste is reduced to a tolerable low level.

The present invention overcomes the disadvantages and difficulties generally encountered in sewage disposal systems where waste material is to be discharged into surrounding waters. The disposal system utilizes heat which may be provided from engine exhaust gases so that the heat therefrom subjects the waste to an elevated temperature thereby controlling the bacterial count of the waste material to a low tolerable level before discharge into surrounding waters. Various heat means may be employed, for example, electrical energy, either in the form of heating elements, high frequency induction heating or heated air. By the process of this invention, incineration and/or chemical treatment is not necessitated for accomplishing a reduction in the bacterial count of sewage waste.

BRIEF DESCRIPTION OF THE DRAWINGS

FIG. 2 is a longitudinal sectional view of another form of a waste disposal assembly;

FIG. 3 is a cross-sectional view taken along the lines 3—3 of FIG. 2; and

FIG. 4 is a sectional view taken along the lines 4—4 of FIG. 3.

DETAILED DESCRIPTION OF THE PREFERRED EMBODIMENTS

Figure 1:
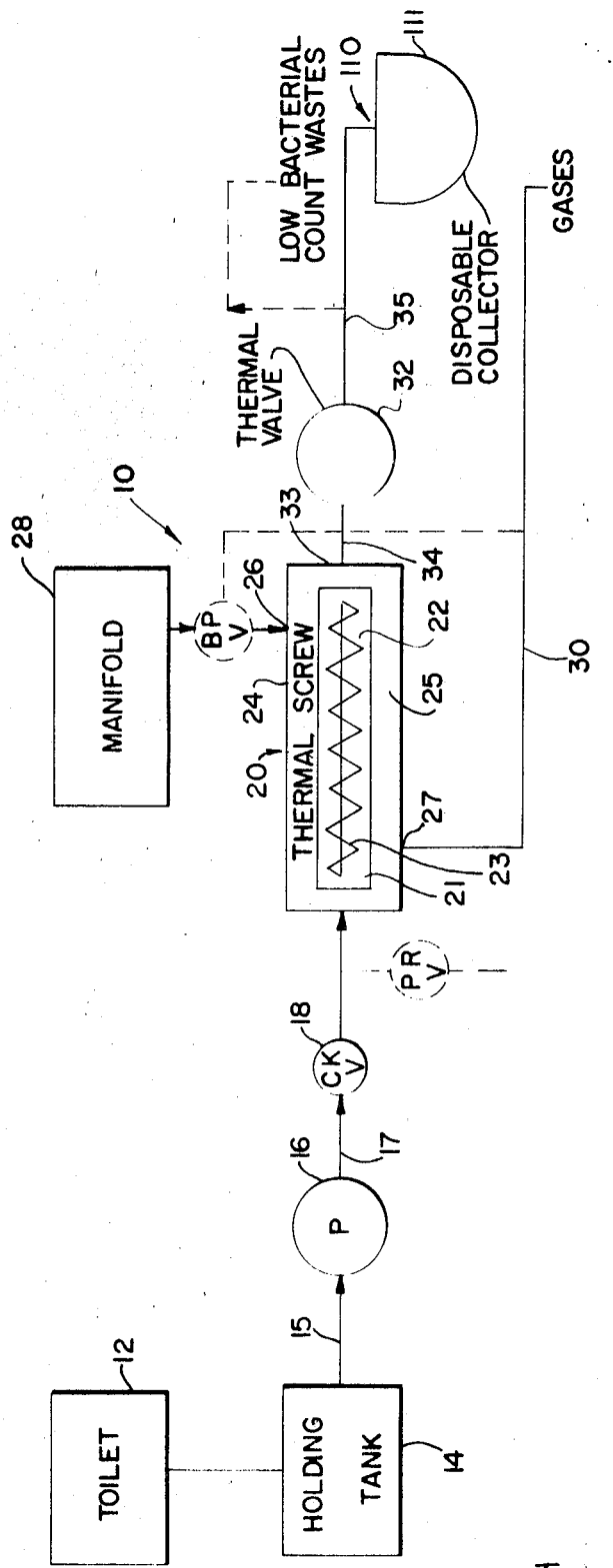
FIG. 1 is a schematic diagram illustrating the various components of one form of a waste disposal assembly.

In the drawings, FIG. 1 illustrates a schematic flow diagram of waste disposal treatment assembly 10. Toilet facility 12 and holding tank 14 are of the type generally provided for marine craft. Coupled to toilet 12 is a holding tank 14 for storing the waste material prior to treatment. Displacement pump 16 is mounted between holding tank 14 and treatment means 20 by conduits 15 and 17 respectively. Treatment means 20 is heated by the exhaust gases of the engine (not shown) from exhaust manifold 28. Interposed in conduit 17 which connects pump 16 to the treatment means or zone is check valve 18. Check valve 18 serves to prevent back pressure of sewage gases emanating from the treatment means from passing through pump 16 and subsequently through toilet facility 12 and into the craft. A pressure relief valve may be provided between check valve 18 and treatment means 20 so that in the event of excess pressure due to sewage gases and/or steam accumulating in the treatment zone a venting of the accumulated gases into the surrounding waters is provided.

Treatment means 20 comprises a tubular housing or casing 21 having a passage 22 therethrough forming a first chamber. Thermal screw 23 is disposed within passage or first chamber 22 and is mounted for rotation therein. Thermal screw 23 is preferred since the action of the screw will pulverize the solid waste in a manner so as to provide an essentially homogenous mass. A jacket 24 is mounted concentrically with respect to the thermal screw and casing assembly and is spaced therefrom thereby forming a second chamber 25. The jacket is provided with gas inlet and outlet openings 26 and 27 through which the exhaust gases discharged from manifold 28 will pass. The heat from the gases will elevate the temperature of the screw and its waste contents within the first chamber so that the temperature of the waste material in the first chamber will be elevated to at least that of boiling water. The vapors, i.e., steam, will intimately contact the pulverized material to substantially destroy all of the bacteria and thereby reduce the bacterial count of the treated sewage waste to a low tolerable level.

The thermal screw is driven by a motor (not shown) having means to control the r.p.m. of the screw so that the waste material is maintained within the first chamber for a sufficient period of time whereby the waste material being discharged is elevated to a temperature at least that of boiling water. Any means may be used to power the screw, for example, the thermal screw may be connected for rotation to the drive shaft of the engine by suitable gearing. Also, a variable speed motor may be employed with suitable means connected thereto for controlling the speed of the screw with respect to the temperature of the waste material at the discharge end of the treatment means. The important feature for driving the screw is that suitable means be provided to control the r.p.m. of the screw so that the retention time of the waste material while subjected to the heat will be sufficient to substantially destroy all of the bacteria so as to reduce the bacterial count to a low tolerable level.

I have found that it is advantageous to introduce the exhaust gases from manifold 28 at the discharge end of the treatment means. Thus, the gases passing through the jacket of the treatment means will flow counter to the direction of the flow of the waste thereby maintaining the hottest zone in the treatment means at its discharge end. The exhaust gases passing through the jacket of the treatment means will exit therefrom adjacent the inlet opening of the thermal screw. The gases will then be conducted through exhaust pipe 30 in the conventional manner.

Thermal or pressure valve 32 may be employed to prevent sewage waste from being discharged from the treatment means at a temperature below that of boiling water thereby assuring that the bacterial count of the waste is at a low tolerable level. Tube 34 is mounted to the treatment means and communicates with the first chamber 22 at discharge opening 33. Thermal valve 32 is mounted in discharge tubes 34 and 35. Also, thermal valve 32 may be a pressure valve having means for maintaining any desired pressure within chamber 22. The desired pressure will be such that the temperature of the waste material will be elevated to at least that of boiling water.

In FIGS. 2 through 4, a second embodiment of my invention is illustrated. FIG. 2 illustrates in section a waste disposal assembly, the component parts thereof and is generally designated by numeral 40. Waste disposal assembly 40 comprises a container or treatment zone 42 for treatment of sewage waste material therein. Container 42 is preferably in the form of a cylinder although other forms are equally suitable. Cylinder 42 is formed having end plates 43 and 44 to enclose the ends thereof. Partition 46 is interposed between end plates 43 and 44 to separate cylinder 42 into a first and second chamber 47 and 48, respectively. It is preferred that the first chamber be provided with a sewage waste inlet opening 49 for connection to a toilet facility. Partition 46 is sealed around its periphery to the inner surface of cylinder 42 such as by welding, swaging or other suitable means. A portion of partition 46 and preferably the lower portion thereof, is formed with perforations and interstices 50 so that as the sewage waste material enters the first chamber 47 a portion of the liquid contents thereof passes into second chamber 48 through pores 50 to a predetermined level to prevent overfilling of cylinder 42. Partition 46 may be formed in which the upper portion is a solid metal plate and the lower portion in the form of a screen. The screen openings may vary over a wide range, for example, 10 to 100 mesh U.S. Standard sieve size, although other size openings may be used. Suitable means may be used to regulate the level of sewage in the treatment zone, such as a float valve or a sensor 52. Outlet valve 54 is mounted in the lowermost portion of cylinder 42 of second chamber 48 for discharging treated liquid sewage. Outlet valve 54 is preferably a pressure-actuated valve so that when the pressure within cylinder 42 is elevated to a first predetermined pressure due to steam formed by the heating of the sewage waste material outlet valve 54 is opened thereby discharging the treated liquid portion of the sewage waste material. Also, a substantial portion of the treated liquid sewage in first chamber 47 will pass or flow into second chamber 48 through pores 50 of partition 46 while valve 54 is in an open position. It should be understood that particles of treated solid sewage waste smaller than the pore openings in partition 46 will also be discharged through valve 54. After the treated liquid sewage is discharged from the second chamber to a predetermined level in cylinder 42, valve 54 is closed by closure means operatively mounted therein and will be described hereinafter.

Outlet 56 is mounted at the lowermost portion of first chamber 47. Outlet 56 is a pressure actuated valve so that when the pressure within cylinder 42 is elevated to a second predetermined pressure due to steam formed by heating the sewage waste material, outlet valve 56 will open. The pressure required to open valve 56 is greater than the pressure required to open valve 54 thereby allowing the solid sewage waste portion of the sewage material to be maintained in cylinder 42 for a greater length of time than the liquid portion thereof. Thus, the solid sewage waste will be subjected to increased temperatures at a higher pressure thereby effecting a reduction of bacterial count to a relatively low tolerable level. For example, valve 54 may be set to open at a pressure of approximately 6 p.s.i.g. and valve 56 may be regulated to open at 12 p.s.i.g. At these pressures the temperature of the sewage waste material in the first and second chambers will be elevated to at least that of boiling water. It is obvious that any predetermined selected differential pressures may be employed or that the same pressures may be employed where syphoning off of the liquid sewage waste material is not required. It is preferred, however, for marine craft where disposal of sewage waste material presents pollution problems the separation of the liquid portion of the sewage material from the solid portion thereof is most desirable.

An air vent 60 is mounted in container 42 above the level of the sewage waste material, for example, in the uppermost portion of cylinder 42. In operation, as cylinder 42 is being filled with sewage waste material air will be expelled through vent 60. Air will continue to be discharged until steam is produced from the heated sewage waste then air vent 60 will automatically close. Thereafter, the sewage waste material contained in cylinder 42 is subjected to elevated temperatures thereby producing steam which increases the pressure in container 42. The sewage waste material is retained in container 42 until it is heated to at least the boiling point of water, at which temperature steam is produced thereby increasing the pressure within cylinder 42. When subjected to sufficient pressure, outlet valves 54 and 56 will open to discharge the treated sewage waste in which the bacterial count of the sewage waste is reduced to a low tolerable level.

In FIG. 4, outlet valve 54 is shown in section mounted to container 42. Valve 54 comprises a tubular sleeve 70 which is mounted in housing 42 at 72 so that a portion of sleeve 70 extends into second chamber 48. The lower end of sleeve 70 is threaded to receive a threaded cup member 71 in which a tube 74 is mounted centrally therein so that it extends into sleeve 70. A shoulder or recess 73 is formed at the base of cup 71 and having an opening therein. A second cup member 75 is threaded to the base of cup 71 and is provided with a pressure control means 76. The pressure control means comprises a disc 78 having formed thereon a raised disc portion 79 which fits into recess 73 so as to form a closure for tube 74. Disc 78 is formed with a depending stem 80 with spring 81 biased to the undersurface of disc 78 and the bottom of cup 75 so that closure means 76 is normally closed. Cup 75 is formed with an opening 82 so that when closure means 76 is in the open position the liquid contents of second chamber 48 will flow therethrough. A tube 84 is mounted in opening 82 to provide a conduit for conducting the treated liquid material to a disposal zone, for example, when the improved sewage waste disposal assembly is mounted to a toilet facility in a marine craft, the tube 84 will extend in communication with the surrounding waters.

Above tube 74 and slidably mounted within sleeve 70 is float 86. Float 86 is held within sleeve 70 by a closure plate 87 mounted to the end of sleeve 70. On the side of sleeve 70 an opening 88 is formed therein to provide means for allowing the liquid contained in second chamber 48 to flow into sleeve 70 and through tube 74. When the level of liquid in second chamber 48 is below opening 88 in sleeve 70, float 86 will fall so that it rests on the end of tube 74 to prevent further discharge of material through valve 54. To accomplish this a depending stem 89 is mounted to the undersurface of float 86 and is formed with a conical end portion 90. Conical end portion 90 will seat in a depending concave portion 91 in tube 74.

Outlet valve 56 as shown in FIG. 2 is mounted on the lowermost portion of cylinder 42. Valve 56 has a body portion 96 which is formed in substantially a "T." A tubular portion of the "T" extends into opening 97 in cylinder 42 and is rigidly mounted therein. Formed at right angles to the connection and spaced from cylinder 42 is a tubular portion 98 forming an outlet opening for the discharge of the solid waste material. A stem 99 having a disc or head portion 100 closes opening 97 by seating on inner wall of tube 98 as shown in FIG. 2. A spring 102 is fitted around stem 99 and is held in place by flanged shoulder 104. The base of spring 102 is biased against a movable flange 105 which is connected to a threaded stem 106. Threaded stem is threaded into valve housing 96. By this means the pressure at which outlet valve 56 will open may be regulated. Outlet tube 98 of valve 56 is coupled to a disposal zone. For example, where the improved waste disposal assembly is mounted to a toilet facility on a marine craft, tube 98 is connected to a disposal container so that treated solid waste material being discharged from first chamber 47 will be deposited into a disposal container. This is shown schematically in FIG. 1.

As shown in FIG. 1, the treated sewage waste material is similarly collected.

Disposal zone 110 is conveniently made in the form of a container 111, for example, plastic or stainless steel, or other noncorrosive materials, although other materials may be employed. For convenience of removing the treated waste material, a plastic disposable bag is employed to line the inner portion of the disposal container 111. When a marine craft having an assembly as described herein is at sea where a pollution problem is not encountered, tube 98 may be provided with a suitable valve to bypass the disposal zone so that the treated sewage waste material may be discharged directly into the surrounding waters.

In FIG. 2, heat means may be mounted in cylinder 42. For example, the exhaust conduit 114 from an engine. Thus, when the engine is in operation the heat from the exhaust gases will pass through conduit 114 and heat the sewage waste material in cylinder 42 by conduction. If necessary and where heat from an engine source is not available, an electric heat means may be employed; for example, calrod units 116 may be mounted in cylinder 42 as shown in FIG. 2 through openings 117 and 118. Disposed in opening 117 is a tubular well 119 with calrod units 116 disposed therein. The calrod units are connected to a suitable source of electricity to provide electrical power to heat the sewage contents disposed in cylinder 42.

When operating my improved sewage waste disposal assembly as shown in FIGS. 1 and 2, the disposal assembly is connected to a toilet facility in a marine craft. It should be understood that such a disposal assembly may be employed in any installation where a toilet facility is necessary or required, such as a house trailer or cabin. Sewage treatment assembly or zone 20 is connected to a toilet facility 12. A holding tank 14 may or may not be employed as desired. When raw sewage waste, generally consisting of solid waste, paper and liquids, is to be treated it is pumped from the toilet facility to the treatment zone 20 by any suitable means such as a pump 16. In some instances, raw sewage may be fed to treatment zone 20 by gravity flow. Heat is applied to the treatment zone from any suitable source, for example, passing hot gases from an engine so that the raw sewage will be heated by conduction, or employing electric heat means such as shown in FIG. 2. The raw sewage is maintained in the treatment zone by a suitable means, such as a valve which may be thermally responsive to open at a preset temperature or a pressure valve which will open at a preset pressure. For the assembly of FIG. 1, I prefer to employ a thermal valve since it is important that the raw sewage be heated to at least the temperature of boiling water to destroy or substantially reduce the bacterial count contained in the raw sewage. In FIG. 2, treatment zone 40 provides for the substantial separation of the raw liquid sewage from the raw solid sewage prior to treatment. Although thermally operated outlet valves would be suitable, I prefer to employ pressure-operated valves. When the sewage waste in treatment zone 40 has been heated, steam is generated which facilitates destruction of bacteria and also the steam pressure provides means for emptying the treated sewage from treatment zone 40. When outlet valve 54 is opened, the steam pressure causes a rapid flow of treated liquid therethrough. A small volume of the liquid remains in treatment zone 40 to provide a source of steam to open valve 56 which is generally set at a higher pressure than valve 54. When valve 56 is opened the treated solids are discharged by the pressure exerted on the solid mass by the steam which in turn is sufficient pressure to transfer the treated solid waste to the disposal zone. Excess steam will clear or substantially clear the solids from partition 46 to open pores 50 and the conduit from valve 56 to the disposal zone.

The waste disposal assembly described in FIG. 1 is designed for continuous or intermittent operation. The treated sewage is discharged from treatment zone 20 and transferred to the disposal zone by means of the force exerted by the screw or auger 23.

In FIG. 2, the raw sewage is treated in batches. It is obvious that treatment means 40 may be employed in place of treatment means 20 of FIG. 1 with only minor modifications at point of connections to the toilet, heat means and disposal zone.

The materials that may be employed for my improved sewage waste disposal assembly may vary greatly. I prefer to use stainless steel where possible. Thus, when the unit is employed as a disposal assembly for marine craft corrosion problems due to salt water are obviated. However, any material may be employed that will withstand heat and pressure.

I claim:

1. An improved sewage waste disposal assembly adapted to be mounted to a toilet facility comprising: a sewage waste treatment means including means for heating said treatment means, means for conveying sewage waste material from said toilet facility to said treatment means whereby said sewage waste material disposed in said treatment means is subjected to heat by said heating means, means for retaining said sewage waste material in said treatment means so that the sewage waste material attains a temperature of at least that of boiling water and steam is produced, pressure actuated discharge valve means actuated by the pressure of said steam for discharging the treated sewage waste material from the treatment means, and treated waste disposal means coupled to the treatment means so that upon discharge of said treated sewage waste material the bacterial count of said treated sewage waste is reduced to a relatively low tolerable level.

2. An improved sewage waste disposal assembly as set forth in claim 1 wherein the heating means mounted on the container is electric heating elements.

3. An improved sewage waste disposal assembly as set forth in claim 1 wherein the heating means is an exhaust conduit disposed in said treatment means and connected to the manifold of an engine whereby the hot gases passing through the exhaust conduit heat the sewage waste material disposed in the treatment means by conduction.

4. An improved sewage waste disposal assembly as defined in claim 1 wherein said treatment means is provided with means mounted thereon to control the level of sewage waste material in said treatment means.

5. An improved sewage waste disposal assembly as set forth in claim 1 wherein said treatment means is provided with a valve for venting air from the treatment means.

6. An improved sewage waste disposal assembly adapted to be mounted to a toilet facility comprising: a sewage waste treatment means including means for heating said treatment means, means for conveying sewage waste material from said toilet facility to said treatment means, said treatment means being in the form of a container having an inlet opening for receiving sewage waste material from said toilet facility, a partition interposed in said container and mounted therein so as to form a first and second chamber, said partition having pores and interstices for the passage of liquid waste therethrough, said first chamber adapted to receive the sewage waste material including liquid waste thereof so that the liquid sewage waste passes through the pores and interstices of said partition into the second chamber, outlet means mounted in said container in the first and second chambers remote from the inlet opening, heating means mounted to said container for heating the sewage waste material and means for retaining said sewage waste material in said treatment means so that said sewage waste material attains a temperature of at least the boiling point of water prior to being discharged through the outlet means in the first and second chambers, said outlet means including discharge valves mounted in the first and second chambers and being pressure actuated so that the sewage waste is discharged through the discharge valves when opened at a predetermined pressure due to steam produced by the heated sewage waste, and means for discharging the treated sewage waste material from the treatment means so that upon discharge of said treated sewage waste material the bacterial count of said treated sewage waste is reduced to a relatively low tolerable level.

7. An improved sewage waste disposal assembly as set forth in claim 6 wherein the pressure-actuated valve mounted in the second chamber opens at a lower pressure than the pressure-actuated valve mounted in the first chamber whereby the treated liquid sewage waste is discharged from the second chamber prior to the discharge of the solid waste material from the first chamber.

8. An improved sewage waste disposal assembly adapted to be mounted to a toilet facility comprising means for transferring sewage waste material to a thermal treating means, said treating means including a first chamber for holding said sewage waste material to be treated therein, said first chamber having an inlet opening for receiving the waste material from the transferring means, a pressure-actuated valve outlet opening actuated by the pressure of steam produced in the first chamber for discharging the treated waste material from the first chamber, a second chamber having heat means mounted thereon whereby the sewage waste material contained in the first chamber is heated by conduction, means for retaining the sewage waste material in the first chamber until the sewage waste material attains a temperature at least that of boiling water and steam is produced prior to discharging the treated waste material from the first chamber and treated waste disposal means coupled to the first chamber whereby the bacterial count of the treated waste material is reduced to a relatively low tolerable level.

9. An improved sewage waste disposal assembly as set forth in claim 8 wherein the means for retaining the waste material in the first chamber is a valve operatively mounted on the assembly and coupled to the discharge opening of the treatment means, the valve being actuated to open and discharge treated sewage waste material from the first chamber at a preselected temperature of at least that of boiling water.

10. An improved sewage waste disposal assembly as defined in claim 9 wherein said valve is pressure actuated.

* * * * *